US010401253B2

(12) United States Patent
Cooper et al.

(10) Patent No.: US 10,401,253 B2
(45) Date of Patent: Sep. 3, 2019

(54) FLUORESCENT DYE FORMULATION AND LEAK DETECTION METHOD

(71) Applicant: Spectronics Corporation, Westbury, NY (US)

(72) Inventors: Jonathan Daniel Cooper, Lloyd Harbor, NY (US); Limin Chen, Dix Hills, NY (US); John Thomas Duerr, Massapequa Park, NY (US); Jennifer Marie Hunt, Lake Grove, NY (US)

(73) Assignee: Spectronics Corporation, Westbury, NY (US)

(*) Notice: Subject to any disclaimer, the term of this patent is extended or adjusted under 35 U.S.C. 154(b) by 0 days.

(21) Appl. No.: 15/484,783

(22) Filed: Apr. 11, 2017

(65) Prior Publication Data

US 2018/0292287 A1 Oct. 11, 2018

(51) Int. Cl.
*G01M 3/20* (2006.01)

(52) U.S. Cl.
CPC .................................... *G01M 3/20* (2013.01)

(58) Field of Classification Search
CPC ....................................................... G01M 3/20
See application file for complete search history.

(56) References Cited

U.S. PATENT DOCUMENTS 5,149,453 A 9/1992 Parekh
5,440,919 A * 8/1995 Cooper .................. G01M 3/38 73/40.7
5,650,563 A 7/1997 Cooper et al.
6,165,384 A 12/2000 Cooper et al.
6,474,098 B2 * 11/2002 Perrine .................. F25B 39/04 210/287
6,476,120 B1 * 11/2002 Bowers .................. C09K 5/044 252/68
6,623,549 B1 * 9/2003 Evans .................. B01D 53/261 55/DIG. 5
7,552,623 B2 6/2009 Cooper et al.
2002/0092317 A1 * 7/2002 Perrine .................. F25B 39/04 62/509
2005/0019934 A1 1/2005 Duerr
2007/0135528 A1 * 6/2007 Butler .................... A61L 27/56 521/61
2010/0221300 A1 * 9/2010 Harley ................ A61L 27/3834 424/422
2013/0270457 A1 10/2013 Boday et al.

OTHER PUBLICATIONS

International Search Report with Written Opinion for International Application No. PCT/US18/26112, dated Jun. 8, 2018.
Parnell, S., et al., "Porosity of silica Stöber particles determined by spin-echo small angle neutron scattering", Soft Matter, 2016, vol. 12, No. 21, pp. 4709-4714.

* cited by examiner

*Primary Examiner* — Samuel P Siefke
(74) *Attorney, Agent, or Firm* — Drinker Biddle & Reath LLP

(57) ABSTRACT

Provided is a porous pellet for inclusion into an operating fluid of a fluid system for detecting sites of fluid leakage. The porous pellet comprises a solid matrix formed by at least one fluorescent dye which is solid at room temperature. The matrix has a porosity of from about 10% to about 90%. Methods of installing the porous pellets into fluid system for detection of leaks is also provided.

25 Claims, 4 Drawing Sheets

FLUORESCENT DYE FORMULATION AND LEAK DETECTION METHOD

FIELD OF THE INVENTION

The invention relates to the field of leak detection in fluid systems, and more particularly leak detection in which a dye is introduced into a circulating fluid, such as a refrigerant.

BACKGROUND OF THE INVENTION

Dyes are used as tracers to detect leaks within fluid systems. Fluid systems are closed systems that include a fluid, either gas or liquid. Fluid systems include, for example, refrigerant systems, transmission systems and hydraulic systems.

One of the most effective methods for detecting leaks in refrigeration systems, and a preferred method to be practiced with the present invention, comprises introducing into a refrigeration system an effective amount of a fluorescent dye compound. The dye compound circulates with the refrigerant and system lubricating oil throughout the refrigeration circuit, and is carried out with escaping refrigerant and oil at a leak site. When the refrigeration system is exposed to ultraviolet light, even a small deposit of the dye compound is brilliantly fluorescent to allow visual detection of the leak. U.S. Pat. No. 5,149,453 discloses such a method for detecting leaks in a refrigeration system, and its entire content is incorporated herein by reference.

U.S. Pat. No. 5,650,563, reissued as U.S. Pat. No. Re. 36,951, the entire disclosure of which is incorporated herein by reference, describes placing a dye into a closed air conditioning or refrigeration system prior to the initial refrigerant charging of the system. Re. 36,951 describes saturating an absorbent wafer, or other suitable substrate carrier, with a mixture of a dye and a solvent for the dye, such as a refrigerant system lubricating oil. This system of placing dye on the substrate carrier is sometimes known as a "wet" system because the dye remains in a liquid state.

It is also known to place a leak detection dye onto a wafer by saturating the wafer with a mixture of dye powder and alcohol. Following evaporation of the alcohol, the dye remains in the form of dye solids dispersed through the wafer. This system of placing dye onto a carrier wafer is sometimes referred to as a "dry" system because of the evaporation of the alcohol from the saturating mixture leaves a dye impregnated wafer. Dye carrier wafers are described in U.S. Pat. No. 5,650,563, reissued as U.S. Pat. No. Re. 36,951, and in U.S. Pat. No. 7,552,623, the entire disclosure of which is incorporated herein by reference.

The dye carrier wafer for use in a refrigerant system is made from a substrate material that is absorbent to liquid but does not react with the refrigerant or system lubricant circulated through a closed refrigeration system. A preferred wafer material is made from a melamine-treated polyester felt mat. The wafer carries a leak detection dye that will be released into the refrigeration system from the wafer when the system is charged with a circulating refrigerant. Thus the dye carrier wafer may be placed within the closed refrigeration system circulated before the system is charged with refrigerant, thus avoiding the need to insert liquid dye into a system already charged with refrigerant. For use in automotive air conditioning systems, the dye carrier wafer must be capable of releasing a detectable portion of its dye within a short period after the system's charging with refrigerant, as leak detection is routinely carried out after charging.

After releasing its dye, the dye carrying wafer, or other inert substrate onto which the dye is absorbed, will remain in the closed air conditioning or refrigeration system, and will longer serve any purpose. Moreover, the impregnation of the dye onto a substrate material requires additional steps, materials and expense in dye product formulation. What is needed is an alternative dye composition that provides the advantages of a substrate-based dye carrier for use in leak detection in fluid system, particularly refrigeration systems.

SUMMARY OF THE INVENTION

A porous pellet for introduction into an operating fluid of a fluid system for detecting sites of fluid leakage is provided. The pellet comprises a solid matrix formed by at least one fluorescent dye which is solid at room temperature. The pellet has a porosity of from about 10% to about 90%.

Also provided is a method of preparing the porous pellet, comprising mixing at least one fluorescent dye which is solid at room temperature in a liquid, to provide a suspension, paste or slurry of the solid fluorescent dye in the liquid; and drying the suspension, paste or slurry to remove the liquid.

In some embodiments of the method, the suspension, paste or slurry is divided into portions of selected shape and/or size, and the portions are dried to remove liquid. In some embodiments, the suspension, paste or slurry is divided into portions of selected shape and/or size by molding or extrusion, which can be conducted at pressurized or ambient atmosphere.

Also provided is a method of introducing a fluorescent dye into a fluid system for detection of leaks in the fluid system, the method comprising: installing, into a component of a fluid system through which an operating fluid circulates, one or more porous pellets comprising a solid matrix formed by at least one fluorescent dye which is solid at room temperature, the one or more pellets having a porosity of from about 10% to about 90%, the pellets also being soluble in the operating fluid.

In certain embodiments of the aforesaid method of introducing the fluorescent dye into a fluid system, the one or more porous pellets are installed into the fluid system component before assembly of the fluid system, followed by the further steps of: assembling the fluid system comprising the component containing the one or more porous pellets; charging the fluid system with operating fluid; and circulating the operating fluid in the system to dissolve the one or more porous pellets and thereby circulate dissolved dye through the fluid system.

In certain embodiments of the aforesaid method of introducing the fluorescent dye into a fluid system, the fluid system is a refrigerant system and the operating fluid comprises at least one refrigerant and a system lubricant. In some embodiments, the fluid system component into which the pellets are installed comprises a dehydrator. In some embodiments, the porous pellets are installed into a desiccant bag of a dehydrator.

Also provided is a method for detecting sites of fluid leaks in a fluid system comprising: introducing into the operating fluid of the fluid system one or more porous pellets comprising a solid matrix formed by at least one fluorescent dye which is solid at room temperature, the pellets having a porosity of from about 10% to about 90%, the pellets being soluble in the operating fluid; circulating the operating fluid through the system to dissolve the porous pellets; irradiating at least a portion of the exterior of the fluid system with light of a wavelength or wavelengths that causes the dye to fluoresce; and inspecting the system portion for the presence or absence of fluorescence thereby signaling that a fluid leak has occurred or has not occurred.

In some embodiments of the aforesaid porous pellets and methods, the porous pellets have a porosity of from about 20% to about 80%, preferably from about 25% to about 75%.

In some embodiments of the aforesaid porous pellets and methods, the porous pellets, the at least one fluorescent dye comprising the pellets is a perylene dye, a naphthalimide dye, a coumarin dye, or a combination thereof. In some embodiments, the dye is a naphthalimide dye.

In some embodiments the porous pellets have a size in the range of from about 0.1 cm to about 10 cm. In some embodiments, the porous pellets have a size range of from about 0.1 to about 5 cm, from about 0.1 to about 4 cm, from about 0.1 to about 3 cm or from about 0.1 to about 2 cm. Other sizes are possible. It may be understood that for irregularly shaped pellets, the stated size indicates the length along the longest dimension.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of +/−20% or +/−10%, more preferably +/−5%, even more preferably +/−1%, and still more preferably +/−0.1% from the specified value, as such variations are appropriate to perform the disclosed methods.

"Room temperature" means a temperature in the range of from about 20° C. to about 25° C.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

As envisioned in the present invention with respect to the disclosed compositions of matter and methods, in one aspect the embodiments of the invention comprise the components and/or steps disclosed herein. In another aspect, the embodiments of the invention consist essentially of the components and/or steps disclosed herein. In yet another aspect, the embodiments of the invention consist of the components and/or steps disclosed herein.

All patents and publications identified herein are incorporated herein by reference in their entirety.

DESCRIPTION OF THE PREFERRED EMBODIMENTS

Figure 1:
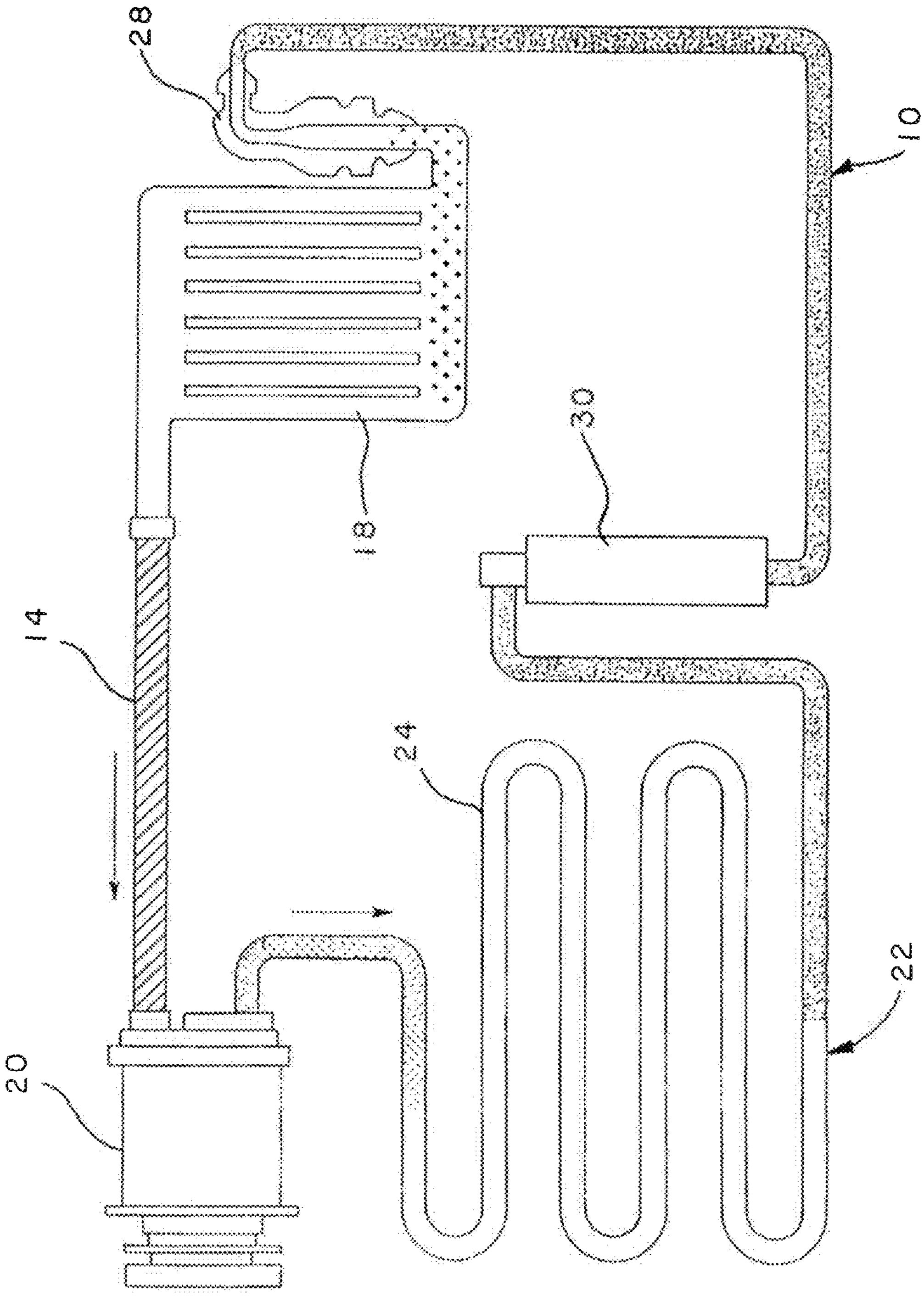
FIG. 1 is a schematic illustration of a basic refrigeration system of an automobile air conditioner having a receiver-dehydrator between the condenser and evaporator.

Provided is a porous dye pellet for use in leak detection in fluid systems. The porous dye pellet provides the advantage of being able to introduce leak detection fluorescent dye into a fluid system prior to initial charging with fluid, e.g., refrigerant/oil, but dispenses with dye-carrying solids such as felts, fabrics and the like that remain in the system after the dye is released, without adding value once the dye is dispensed. The porous dye pellet is characterized by an open-cell foam-like matrix structure that provides a more favorable dissolution profile than non-porous solid dye formulations, such as non-porous pellets. The pellet is formed of at least one fluorescent dye which is solid at room temperature. The pellet matrix is monolithic in that the matrix structure is formed by the solid dye itself. Since the solid matrix of the dye is formed by the dye itself, there is no need for additional solid phase materials such as felts, fabrics or the like to serve as a carrier for the dye.

The porous dye pellet is prepared by mixing a fluorescent dye in a liquid. The liquid may comprise a single liquid substance, or a mixture of liquid substances. In some embodiments, the dye may be at least partially soluble in the liquid. In some embodiments, the dye may be essentially insoluble in the liquid. The dye and liquid are mixed under conditions to form a suspension, slurry or paste of the solid dye. The resulting solids/liquid mixture is advantageously in the form of a paste, which provides for easy shaping, sizing and further processing and handling. The mixture is dried under conditions to substantially completely remove the liquid, leaving a porous structure consisting of a matrix of the dye. Any drying method that results in substantially complete removal of the liquid while maintaining the structural integrity of the resulting porous solid may be utilized. Preferred is drying in a controlled environment, such as oven drying or vacuum drying. The liquid is preferably completely driven off, such that no more than a trace amount of liquid remains in the pellet.

The degree of pellet porosity, and hence the rate of pellet dissolution in the working fluid of the fluid system, is controlled by selecting the concentration of the dye in the liquid and also the conditions of drying. The suspension, slurry or paste thus formed is divided into portions of the desired size and/or shape for drying in order to generate pellets appropriately sized and shaped for the end use. The pellets may be rendered in the desired size and shape, for example, by resort to the use of molds for the slurry/paste, or by extrusion into the desired sized and shaped bodies.

In certain embodiments, the liquid is selected such that the dye, which is a solid at room temperature, is at least partially dissolved to generate the desired porous structure upon drying. For dyes that are soluble in organic solvents, such liquids include, for example, alcohols, ketones, various nonpolar solvents such as benzene, toluene and the like, and other hydrocarbon solvents. For dyes that are soluble in polar or aqueous solvents, the liquid is selected accordingly. Water is one such solvent. In other embodiments, the dye is minimally soluble or essentially insoluble in the liquid, resulting in a suspension or slurry.

The liquid should also be chemically inert to the dye, i.e., should not chemically react with the dye. Also, the liquid should have a sufficiently low boiling point that it can be driven off by drying under normal conditions without causing collapse of the matrix structure of the pellet. For example, a liquid compatible with the dye should be capable of being driven off by heating of the slurry or paste at 50° C. for 24 hours.

The pellet should be sufficiently porous to provide for the desired dissolution profile in the working fluid, but retain sufficient rigidity to avoid crumbling upon ordinary handling and conditions of shipping. According to certain embodiments, the porosity of the pellet advantageously ranges from about 10% to about 90%, from about 20% to about 80%, from about 25% to about 75%, from about 30% to about 70%, from about 30% to about 65%, from about 30% to about 60%, from about 35% to about 65%, or from about 40% to about 60%. In certain embodiments, the porosity is about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%. Below about 10% porosity, the pellet will not have the desired dissolution characteristics. Above about 90% porosity, the mechanical strength of the pellet may be reduced.

Porosity of a porous pellet sample is determined as follows. The mass of a dried pellet is subtracted from the mass of the dye/solvent mixture before drying. The result is the sample solvent mass before drying. The solvent mass is converted to volume, based upon the known density of the solvent. The solvent volume thus determined represents the volume of the dried pellet that is not occupied by dye, or the pellet "pore volume", $V_p$. Comparison of the pore volume, $V_p$, to the pellet total volume, $V_t$, yields the porosity of the pellet: Porosity=$(V_p/V_t)\times 100\%$.

The porous pellet may comprise a variety of sizes and shapes. Pellet shape may be selected by forming a paste of the dye/solvent mixture and molding the paste into the desired shape, e.g., sphere, oval, rectangular, square, rod, ring, etc. The pellet shape may be advantageously selected to be accommodated in the chamber or other structure into which it is inserted, such as a chamber within a component of a refrigeration system. The pellet may be rendered in a complex structure, such as ring, for integration into a mechanical system. The pellet shape, and also size, may be selected to obtain the desired dissolution profile in working fluid. Pellet size may range, for example, from about 0.1 cm to about 10 cm. In some embodiments, the porous pellets have a size range of from about 0.1 to about 9 cm, from about 0.1 to about 8 cm, from about 0.1 to about 7 cm, from about 0.1 to about 6 cm, from about 0.1 to about 5 cm, from about 0.1 to about 4 cm, from about 0.1 to about 3 cm, from about 0.1 to about 2 cm, or from about 0.5 to about 2.0 cm. In certain embodiments, the size is in the range of from about 0.5 to about 1.9 cm, from about 0.5 to about 1.8 cm, from about 0.5 to about 1.7 cm, from about 0.5 to about 1.6 cm or from about 0.5 to about 1.5 cm.

One preferred pellet size is about 1 cm. By "size" is meant the distance measured along the longest dimension of the pellet. For a generally spherical pellet, the size is the diameter.

The dye from which the pellet is formed is selected from fluorescent dyes that are solid at about room temperature at one atmosphere pressure. One such fluorescent dye is the naphthalimide dye available from Spectonics Corporation under product number 107832 which is soluble in alcohol. Another room temperature solid dye is N-butyl-4-(butylamino)naphthalimide, also known as Solvent Yellow 43, which is also soluble in alcohol.

Apart from existing in the solid state at room temperature, the fluorescent dye is further advantageously selected such that it is soluble in the working fluid of the fluid system into which the pellet is to be installed, e.g., air conditioning refrigerant, engine lubricating oil, transmission fluid, brake fluid, power steering fluid, hydraulic fluid radiator coolant, diesel oil or gasoline. For application to refrigerant system leak detection, the fluorescent dye is preferably soluble both in the refrigerant and the system lubricating oil. Refrigeration systems utilizing CFC or HCFC refrigerants use mineral oil, polyolester, or alkyl benzene lubricants. HFC refrigerants generally require a polyalkylene glycol or polyolester lubricant. Blended refrigerants can use any of these oils, depending on the characteristics of the blend's constituents. In certain embodiments for application to refrigerant systems, the fluorescent dye is soluble in a polyolester lubricant. By "soluble" is meant soluble at room temperature and one atmosphere pressure.

In certain embodiments, the fluorescent dye is one which fluoresces in response to irradiation by a UV/blue light. UV/blue fluorescent leak detection dyes used today are either perylene fluorescent compounds or naphthalimide fluorescent compounds. Some perylene dyes produce an intense yellow fluorescent response when exposed to incident radiation in a band of the electromagnetic spectrum which includes the long wave ultraviolet (UV-A) wavelength range of about 315 nm to about 400 nm, with a strong peak between about 340 to 375 nm. Other perylene dyes may fluoresce when exposed to incident radiation up to 450 nm. Long-wave ultraviolet is also referred to as "black light", as it includes a small segment of the visual violet range. Naphthalimide dyes fluoresce a brilliant green when exposed to incident radiation of visible violet/blue light. The visible violet/blue range extends from about 400 nm to about 480 nm within the electromagnetic spectrum. Some naphthalimide dyes may fluoresce when exposed to incident radiation from about 365 nm to about 450 nm. Both perylene and naphthalimide dyes are useful for leak detection. Coumarin dyes comprise another class of leak detection fluorescent dyes. Coumarin dyes fluoresce in a variety of colors, including blues, greens, reds, and oranges when excited with light in the range of about 365 nm to about 450 nm. As used herein, the term "perylene dye" refers to the class of organic dyes that includes perylene and substituted perylene; term "naphthalimide dye" refers to the class of organic dyes that includes naphthalimide and substituted naphthalimide; the term "coumarin dye" refers to the class of organic dyes that includes perylene and substituted perylene. Suitable leak detection fluorescent dyes may also include thioxanthane, naphthoxanthene and fluorescein dyes.

The porous pellet may comprise a combination of dyes. For example, the pellet may comprise a mixture of perylene and naphthalimide dyes. A combination of perylene, naphthalimide and coumarin dyes that fluoresce white may be utilized. In certain embodiments, the pellet comprises three dyes. In other embodiments the pellet comprises two dyes. Preferably, the pellet comprises a single dye.

While the porous pellet may optionally comprise additives such as binders, stabilizer, release agents and the like, it is preferred that the content of the pellet is restricted to the dye per se, and no more than trace amounts of residual liquid used in the pellet preparation process. Also, such additives should not comprise a second solid phase in the pellet. In other words, the inclusion of any such additive advantageously will not disrupt the monolithic nature of the pellet as a single discrete solid phase.

Thus, in one embodiment, the pellet is free of any additional substances. In some embodiments, the pellet consists essentially of the fluorescent dye. In other embodiments, the pellet consists of the fluorescent dye.

The porous pellets may be utilized to introduce fluorescent dye into a fluid system for detecting sites of fluid leakage. In one embodiment, the pellets are introducing into the operating fluid of the fluid system after charging the system with fluid. Operating fluid is circulated through the system to dissolve the porous pellets. In another more preferred embodiment, the porous pellets are introduced into a fluid system before charging with operating fluid. Following installation of the pellets, the system is then charged with operating fluid. The pellets are dissolved by circulating the fluid. The pellets may thus be introduced into any component of a fluid system through which the operating fluid flows. It is preferred, however, to install the pellets in a manner in which movement through the system is prevented prior to dissolution. In certain embodiments, the pellet is shaped to conform to a shape located in the interior of the component into which it is inserted.

When installing the porous pellets into a system in advance of charging, the pellets may be placed into a system component through which operating fluid circulates when the fluid system is assembled and operated. The fluid system, including the pellet-loaded component is then assembled. The system is then charged with operating fluid. The fluid is circulated to dissolve the pellets and thereby circulate dissolved dye through the fluid system.

Regardless of the manner in which the pellets are installed into the fluid system, following dissolution of the pellets and the circulation of the dye, the system is inspected for leakage by irradiating the system exterior or portion(s) thereof with a light of wavelength(s) that causes the dye to fluoresce. For example, to cause a naphthalimide dye to fluoresce, visible violet/blue light (365-450 nm) may be utilized.

The practice of the invention in a fluid system is illustrated as follows, in the context of a basic closed refrigeration circuit, of the type found in an automobile air conditioner. It may be appreciated that the practice of the invention is not limited to such refrigeration circuits, but extends to all fluid systems comprising a circulating system that flows within system components that may be subject to fluid leakage.

Figure 2:
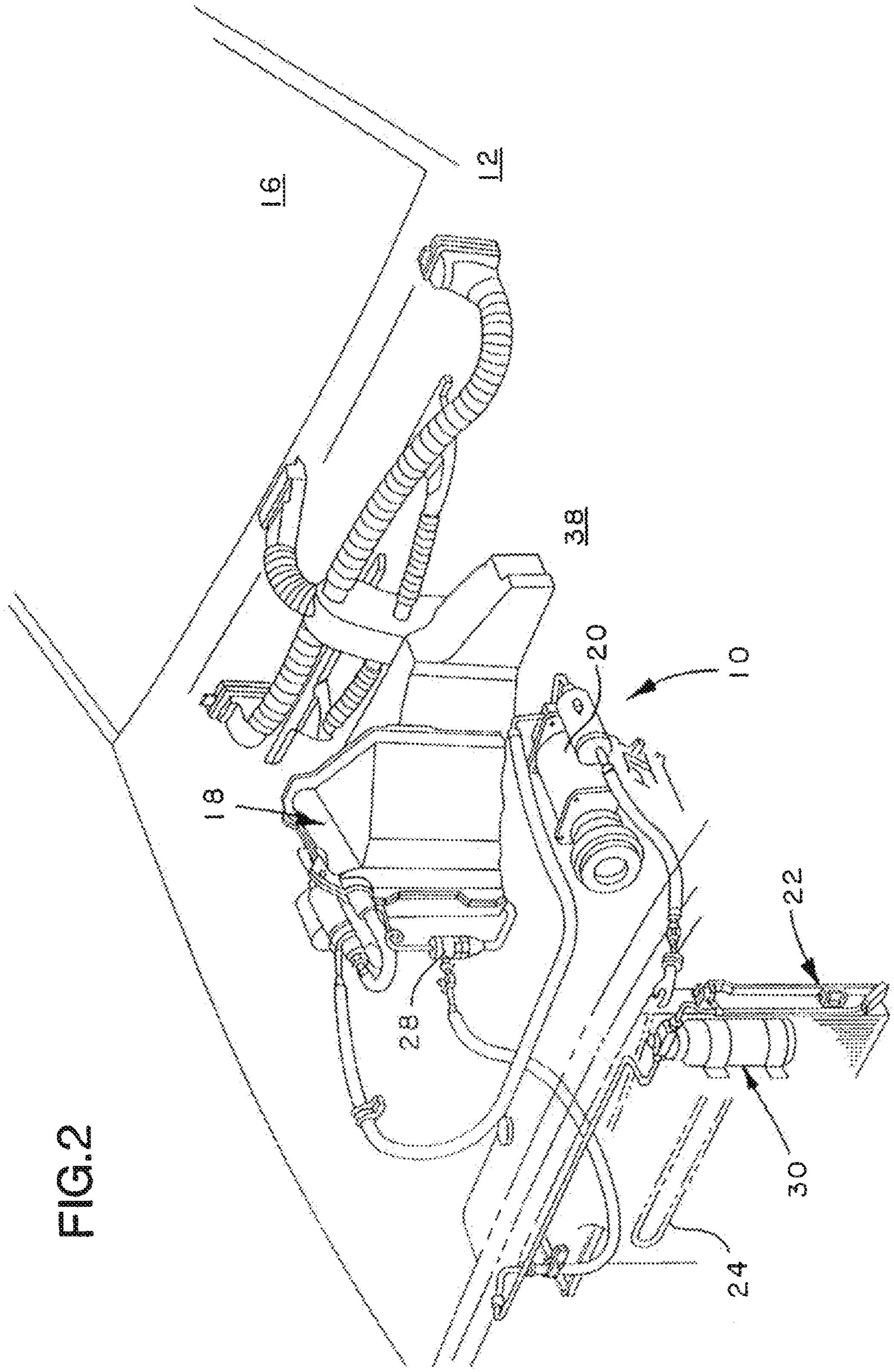
FIG. 2 is a perspective view of an automobile air conditioner system showing the major components as installed in an automobile.

Referring to the drawings in detail, wherein like numerals indicate like elements, FIG. 1 illustrates a basic closed refrigeration circuit 10 of an automobile air conditioner, by which air inside the automobile is cooled and dehumidified. FIG. 2 provides greater detail of the system 10 as it is arranged in an automobile 12.

A refrigerant 14, such as R-134a (1,1,1,2-tetrafluoroethane) or HFO-1234-yf, circulates under pressure in the air conditioning/refrigeration system. In each cycle, the refrigerant is caused to change phase from liquid to gas and back to liquid, absorbing heat from the passenger compartment 16 and releasing heat outside the compartment.

The air conditioning system 10 has an evaporator unit 18 where subcooled liquid refrigerant enters and is allowed to expand and absorb heat from warm air of the passenger compartment, causing the refrigerant to vaporize. The warm air of the passenger compartment 16 is connected to the evaporator 18 via ducting, as seen in FIG. 2, such that the cooled and dried air is recirculated into the passenger compartment. After absorbing heat from the passenger compartment, the refrigerant gas is drawn from the evaporator by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releases its heat of condensation, and changes phase back to a hot liquid, still at a high pressure. The refrigerant 14 completes the cycle by passing through a thermostatic expansion valve 28, which meters the high pressure liquid refrigerant 14 as a low pressure spray into the evaporator 18.

In some systems it is necessary to reservoir the liquid refrigerant before it is metered through the expansion valve because the demand of the evaporator varies under varying conditions. In other systems it is a practice to install an accumulator between the evaporator and compressor so that no liquid can enter the compressor. In either system, water contamination in the refrigerant can cause the water vapor to freeze at the point of expansion, causing refrigerant flow to be blocked, and to react with refrigerants to form acids that may cause internal damage to metal parts. Consequently, in the depicted embodiment a receiver-dehydrator, also referred to as receiver-drier, 30 is located between the condenser 22 and the evaporator 18 to reservoir the refrigerant and remove moisture from it. In other air conditioner systems, an accumulator-dehydrator may be located between the evaporator and compressor to accumulate the refrigerant vapor and remove moisture from it.

Figure 3:
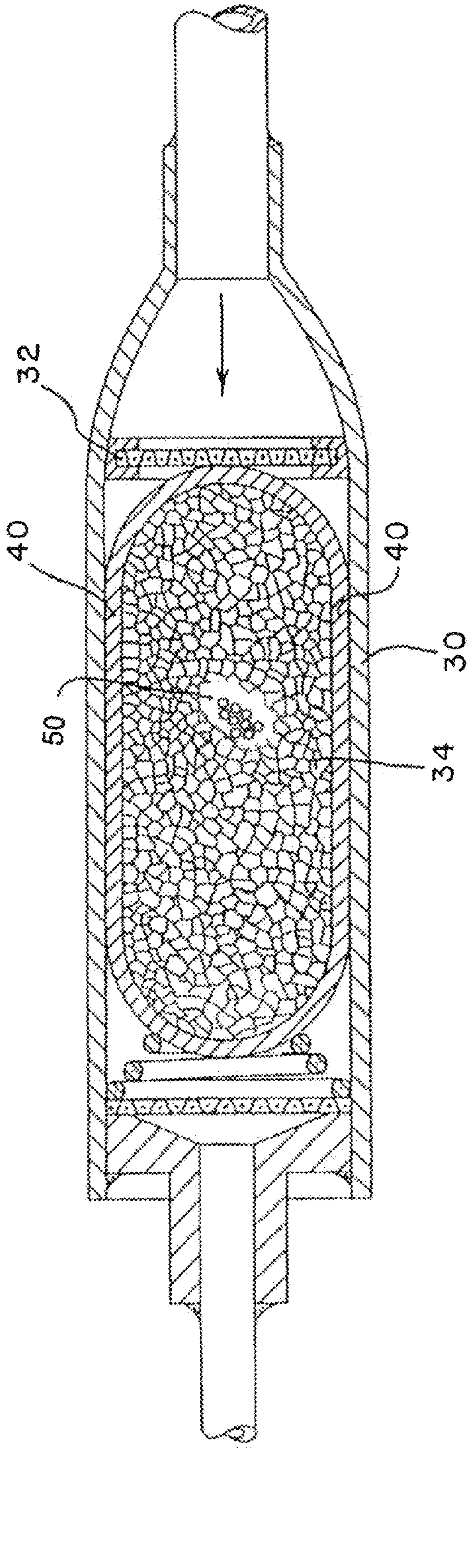
FIG. 3 is a sectional view of a receiver-dehydrator unit having installed therein a desiccant bag containing dye pellets according to the invention.

As shown in FIG. 3, a receiver-dehydrator 30 may contain a filter 32 to remove foreign particles and a permeable bag 40 of desiccant material 34 to remove moisture from the circulating refrigerant 14. Also contained in the bag 40 of desiccant material is a collection of porous pellets 50 comprising fluorescent dye. The porous pellets may be contained loose in the desiccant material in desiccant bag 40, or may be physically separated from the desiccant material by an inner permeable bag (not shown). Alternatively, the porous pellets may be immobilized by adhesion to the desiccant material 34 or bag 40.

Although not shown, it will be understood by those skilled in the art that desiccant bags are also used in the accumulator of a cycling clutch orifice tube (CCOT) type of automobile air conditioner, and in the Valves-in-Receiver (VIR) assembly of VIR type air conditioners, and may be found in other locations of the refrigerant circuit in other types of refrigeration systems. The porous pellets may be placed in those desiccant bags.

As shown in FIG. 2, the air conditioning system components are located in different parts of the engine compartment 38 and attached to various other components of the automobile. When the air conditioner is assembled and installed in the automobile, the system is evacuated to remove air and moisture prior to charging with refrigerant. The system is charged by releasing refrigerant under pressure from a container through the system service valves to enter the system. The porous dye pellets begin to dissolve in the circulating refrigerant. At this point, the system may be inspected for leaks by exposing the system components to light of the appropriate wavelength to induce fluorescence of the dissolved dye.

The size and number of the pellets is selected to provide the desired concentration of fluorescent dye in the circulating refrigerant and lubricant upon pellet dissolution. The concentration will generally be a concentration that is sufficient to render leaks visible upon inspection, but not so high as to adversely affect fluid system operation.

It should be noted that the installation of the porous pellets into refrigerant system desiccant bags is only one way to install the pellets in a refrigerant system. The pellets may be introduced into other system components through which the operating fluid, i.e., refrigerant, flows. It is preferred, however, to install the pellets in a manner in which movement through the system is prevented prior to dissolution.

The practice of the invention is illustrated by the following non-limiting examples.

EXAMPLES

Example 1

A paste, similar to a toothpaste, was prepared by mixing 21.55 g of the naphthalimide dye available from Spectonics Corporation under product number 107832 and 15 mL of denatured alcohol. The resulting mixture yielded a slurry of paste consistency containing 1.44 g of dye per mL of alcohol. The slurry was formed into a series of rough bodies and placed into an oven pre-set to 50° C. for 24 hours to drive off residual alcohol. The resulting rough porous pellets were collected. Based on the amount of the dye utilized, and the size measurements of the resulting rough porous pellets, a theoretical pellet diameter of 7.76 mm would contain approximately 0.145 g, the amount of dye contained in the typical ⅜" dye-impregnated fabric wafer. The pellets were characterized by a porosity of about 41%.

Example 2

Figure 4:
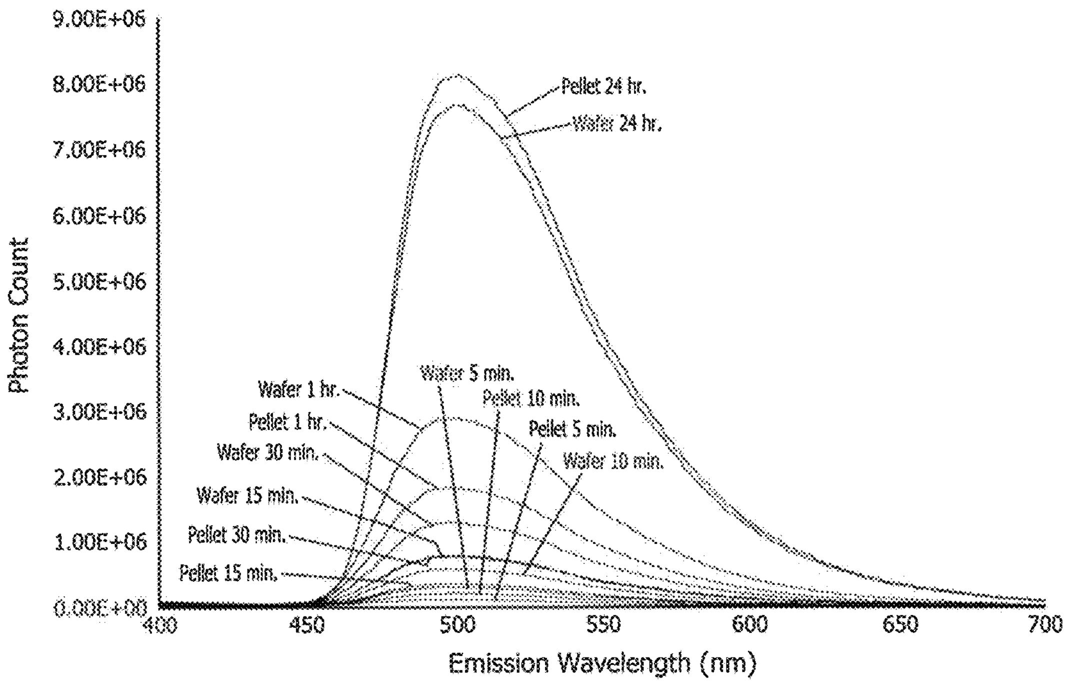
FIG. 4 compares the release of naphthalimide fluorescent dye into HFO-1234-yf/polyalkylene glycol from a porous pellet ("Pellet") according to the present invention versus a fabric wafer ("Wafer") impregnated with the same dye. Dye fluorescence (photon count) is plotted as a function of emission wavelength (nm) from measurements conducted at T=5 min., 10 min., 15 min. 30 min., 1 hr. and 24 hr.

Because of original equipment manufacturer specifications in the automotive industry, a dye-impregnated substrate contained for example in the desiccant bag of receiver-hydrator assembly must be capable of releasing a leak-detectable amount of dye within a short period after system charging with refrigerant. The following study compares the release profile of a typical ⅜" dye-impregnated fabric wafer containing approximately 0.140 g of dye against the dissolution profile of a 0.145 g porous pellet prepared according to Example 1 using the identical dye. The wafer was placed in a bottle containing refrigerant charge fluid containing the refrigerant HFO-1234-yf (2,3,3,3-tetrafluoropropene) and the compressor lubricating oil polyalkylene glycol (PAG). The wafer was placed in the fluid at a ratio of 1 wafer to 8.4 oz. fluid. Similarly, the porous dye pellet weighing 0.145 g was dissolved within 8.4 oz. of the same fluid, resulting in the same dye application ratio as the wafer. The samples were shaken with a benchtop shaker. Small samples from each system were then taken at varying time intervals for fluorometric evaluation. The results are shown in FIG. 4, plotting photon count versus emission wavelength for samples taken at 5, 10, 15 and 30 minutes, and 1 and 24 hours. The porous dye pellet initially released dye more slowly than the wafer; however, after 24 hrs. the porous dye pellet released more dye than the felt wafer at 24 hrs. The dissolution profile of the porous pellet in HFO-1234-yf/PAG fluid is within acceptable agreement with the release profile of the dye-impregnated fabric wafer in the same fluid.

All references discussed herein are incorporated by reference. One skilled in the art will readily appreciate that the present invention is well adapted to carry out the objects and obtain the ends and advantages mentioned, as well as those inherent therein. The present invention may be embodied in other specific forms without departing from the spirit or essential attributes thereof and, accordingly, reference should be made to the appended claims, rather than to the foregoing specification, as indicating the scope of the invention.

The invention claimed is:

1. A method of introducing a fluorescent dye into a fluid system for detection of leaks in the fluid system, the method comprising:

installing, into a component of a fluid system through which an operating fluid circulates, one or more porous pellets comprising a solid matrix formed by at least one fluorescent dye which is solid at room temperature and said one or more pellets having a porosity of from about 10% to about 90%, said pellets being soluble in the operating fluid and wherein the solid matrix does not contain additional solid phase materials and said porous pellet being prepared by mixing said at least one fluorescent dye with a solvent selected from the group consisting of a nonpolar solvent, a polar solvent and an aqueous solvent, and then the mixture is dried to create the pellet having the porosity of from about 10% to about 90%.

2. The method according to claim 1, wherein the one or more porous pellets are installed into the fluid system component before assembly of the fluid system, the method further comprising:

assembling the fluid system comprising the component containing the porous pellets;

charging the fluid system with operating fluid; and circulating the operating fluid in the system to dissolve the one or more pellets and thereby circulate dissolved dye through the fluid system.

3. The method according to claim 2, wherein the fluid system is a refrigerant system and the operating fluid comprises at least one refrigerant and a system lubricant.

4. The method according to claim 3 wherein the fluid system component into which the pellets are installed comprises a dehydrator.

5. The method according to claim 4 wherein the one or more porous pellets are installed into a desiccant bag of a dehydrator.

6. The method according to claim 1, wherein the one or more porous pellets have a porosity of from about 20% to about 80%.

7. The method according to claim 6, wherein the one or more porous pellets have a porosity of from about 25% to about 75%.

8. The method according to claim 1, wherein the at least one fluorescent dye is a perylene dye, a naphthalimide dye, a coumarin dye, or a combination thereof.

9. The method according to claim 8, wherein the at least one fluorescent dye is a naphthalimide dye.

10. The method according to claim 1 wherein a porous pellet is shaped to conform to a shape located in the interior of the fluid system component into which the pellet is inserted.

11. The method according to claim 1, wherein the one or more porous pellets have a size in the range of from about 0.1 cm to about 10 cm.

12. The method according to claim 11, wherein the one or more porous pellets have a size in the range of from about 0.1 cm to about 5 cm.

13. The method according to claim 12, wherein the one or more porous pellets have a size in the range of from about 0.5 cm to about 2 cm.

14. The method according to claim 7, wherein the one or more porous pellets have a porosity of from about 30% to about 70%.

15. The method according to claim 14, wherein the one or more porous pellets have a porosity of from about 35% to about 65%.

16. The method according to claim 15, wherein the one or more porous pellets have a porosity of from about 40% to about 60%.

17. The method according to claim 1, wherein the solid matrix is a monolithic formed by the dye itself.

18. The method according to claim 1, wherein the solid matrix is an open-cell-foam like matrix formed by the dye itself.

19. A method for detecting sites of fluid leaks in a fluid system comprising:

introducing into the operating fluid of the fluid system one or more porous pellets comprising a solid matrix formed by at least one fluorescent dye which is solid at room temperature, said pellets having a porosity of from about 10% to about 90%, said pellets being soluble in the operating fluid and wherein the solid matrix does not contain additional solid phase materials; said porous pellet being prepared by mixing said at least one fluorescent dye with a solvent selected from the group consisting of a nonpolar solvent, a polar solvent and an aqueous solvent, and then the mixture is dried to create the pellet having the porosity of from about 10% to about 90%, circulating the operating fluid through the system to dissolve the one or more porous pellets;

irradiating at least a portion of the exterior of the fluid system with light of a wavelength or wavelengths that causes the dye to fluoresce; and inspecting the system portion for the presence or absence of fluorescence signaling that a fluid leak has occurred or has not occurred.

20. The method according to claim 19, wherein the one or more porous pellets have a porosity of from about 20% to about 80%.

21. The method according to claim 20, wherein the one or more porous pellets have a porosity of from about 25% to about 75%.

22. The method according to claim 19, wherein the at least one fluorescent dye is a perylene dye, a naphthalimide dye, a coumarin dye, or a combination thereof.

23. The method according to claim 19, wherein the at least one fluorescent dye is a naphthalimide dye.

24. The method according to claim 19, wherein the solid matrix is a monolithic formed by the dye itself.

25. The method according to claim 19, wherein the solid matrix is an open-cell-foam like matrix formed by the dye itself.

* * * * *